United States Patent
Oechel

(10) Patent No.: US 7,178,862 B2
(45) Date of Patent: Feb. 20, 2007

(54) SLIDING ROOF SYSTEM

(75) Inventor: Holger Oechel, Frankfurt (DE)

(73) Assignee: ArvinMeritor GmbH, Dietzenbach (DE)

( * ) Notice: Subject to any disclaimer, the term of this patent is extended or adjusted under 35 U.S.C. 154(b) by 21 days.

(21) Appl. No.: 11/100,792

(22) Filed: Apr. 6, 2005

(65) Prior Publication Data

US 2005/0231007 A1 Oct. 20, 2005

(30) Foreign Application Priority Data

Apr. 16, 2004 (DE) ............ 10 2004 018 461

(51) Int. Cl.
  *B60J 7/057* (2006.01)
(52) U.S. Cl. ............ 296/216.02; 296/220.01; 296/223
(58) Field of Classification Search ............
  296/216.02–216.05, 222, 223, 220.01
  See application file for complete search history.

(56) References Cited

U.S. PATENT DOCUMENTS

| | | | | |
|---|---|---|---|---|
| 4,650,243 A | * | 3/1987 | Hanley et al. ............ 296/221 |
| 4,679,846 A | * | 7/1987 | Lux et al. ............ 296/214 |
| 4,699,421 A | * | 10/1987 | Schaetzler et al. ......... 296/221 |
| 4,741,573 A | * | 5/1988 | Yokota ............ 296/221 |
| 4,923,246 A | * | 5/1990 | Takahashi et al. ......... 296/221 |
| 4,995,665 A | * | 2/1991 | Ichinose et al. ............ 296/213 |
| 5,026,113 A | * | 6/1991 | DiCarlo et al. ............ 296/221 |
| 5,464,267 A | * | 11/1995 | Racine et al. ......... 296/216.03 |
| 5,707,102 A | * | 1/1998 | Takahashi et al. ......... 296/223 |
| 2003/0011215 A1 | * | 1/2003 | Arnold et al. ............ 296/223 |

* cited by examiner

*Primary Examiner*—Dennis H. Pedder
(74) *Attorney, Agent, or Firm*—Garlson, Gaskey, & Olds

(57) ABSTRACT

A sliding roof system includes at least one guide rail, a carriage shiftable in the guide rail, and a cover support coupled with the carriage. The cover support is adapted to be attached to a cover that is movable to open and close a roof opening. A first lifting lever has one end connected to the cover support and another end connected to the carriage with guide pieces received within slots formed in the carriage.

15 Claims, 8 Drawing Sheets

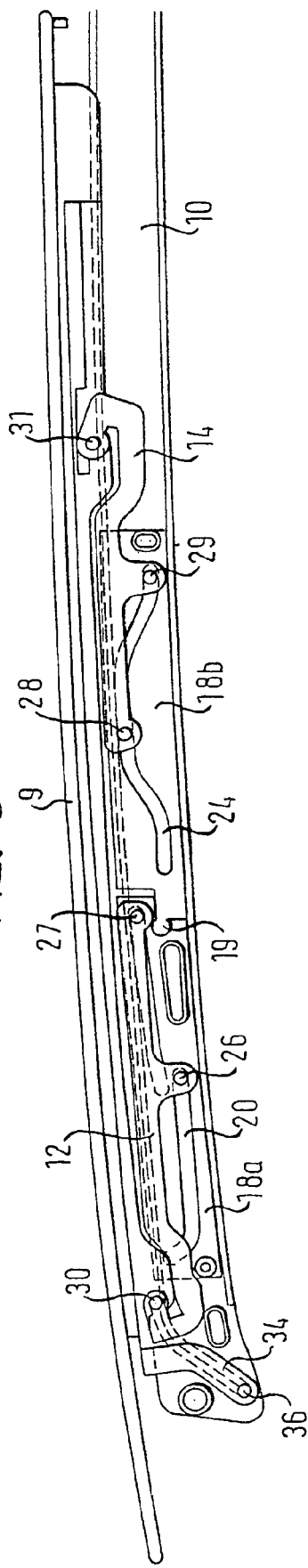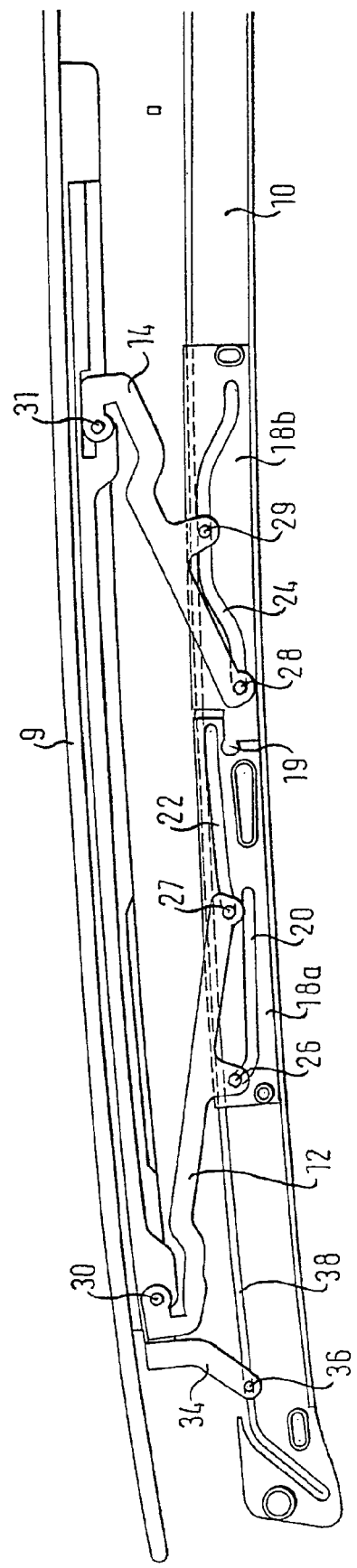

SLIDING ROOF SYSTEM

BACKGROUND OF THE INVENTION

The application claims priority to German Application No. 10 2004 018 461.5, which was filed on Apr. 16, 2004.

The invention relates to a sliding roof system comprising at least one guide rail, a carriage shiftable in the guide rail, and a cover support adapted for attachment to a cover and coupled with the carriage.

Sliding roof systems for vehicles are generally known. These sliding roof systems are capable of shifting at least one cover (made from sheet metal, plastics or glass, for instance) between a closed position and an open position. In the closed position, an opening in a vehicle roof will be closed. When the cover is in the open position, the opening will be at least partially exposed.

All sliding roof systems in which the cover is shifted outwardly, such that the cover lies on an outer surface of the vehicle roof in the open position, share a common feature regarding travel and height. It is desirable to provide as much outward travel as possible in combination with an overall height of the sliding roof system that is as small as possible. With a multitude of systems, the travel is directly provided by slotted pieces that are attached to a guide rail or a carriage. In this configuration, the travel is smaller than the height of the guide rail. In order to obtain a particularly large travel, the guide rail has to be constructed to have an increased height, which in turn results in a reduced headroom in an interior of the vehicle. Constructions are also known in which a lifting motion, which is predefined by a slotted piece, is translated by means of levers into a larger travel of the cover. These systems, however, are relatively complicated.

It is the objective of the present invention to provide a sliding roof system of the type initially mentioned, in which a particularly large travel can be achieved with low effort.

SUMMARY OF THE INVENTION

In order to meet this objective, a sliding roof system includes a first lifting lever that has one end connected to a cover support and another end connected to a carriage with two guide pieces that are movable within slots. This type of connection is referred to as a "slotted piece guide." The first lifting lever produces a desired large lifting motion because the first lifting lever is directly coupled with the carriage with a slotted piece guide connection. This provides a particularly simple construction, which can be manufactured at favorable costs, and with low tolerances. The term "slotted piece guide" means in this context the engaging of a movable element in a slotted piece.

According to a preferred embodiment of the invention, the sliding roof system includes a second lifting lever that has one end connected to the cover support and another end connected with two guide pieces to the carriage in a slotted piece guide connection. In this way it is possible to have full control over the lifting motion of the cover just by the movement of the carriage and without any intermediate levers or complicated transmissions.

Advantageous designs of the invention will be apparent from the sub-claims.

BRIEF DESCRIPTION OF THE DRAWINGS

FIG. 5 shows in a view corresponding to that of FIG. 2, a sliding roof system according to a second embodiment of the invention.

FIG. 6 shows in a view corresponding to that of FIG. 4, the sliding roof system according to the second embodiment.

DETAILED DESCRIPTION OF THE PREFERRED EMBODIMENT

Figure 1:
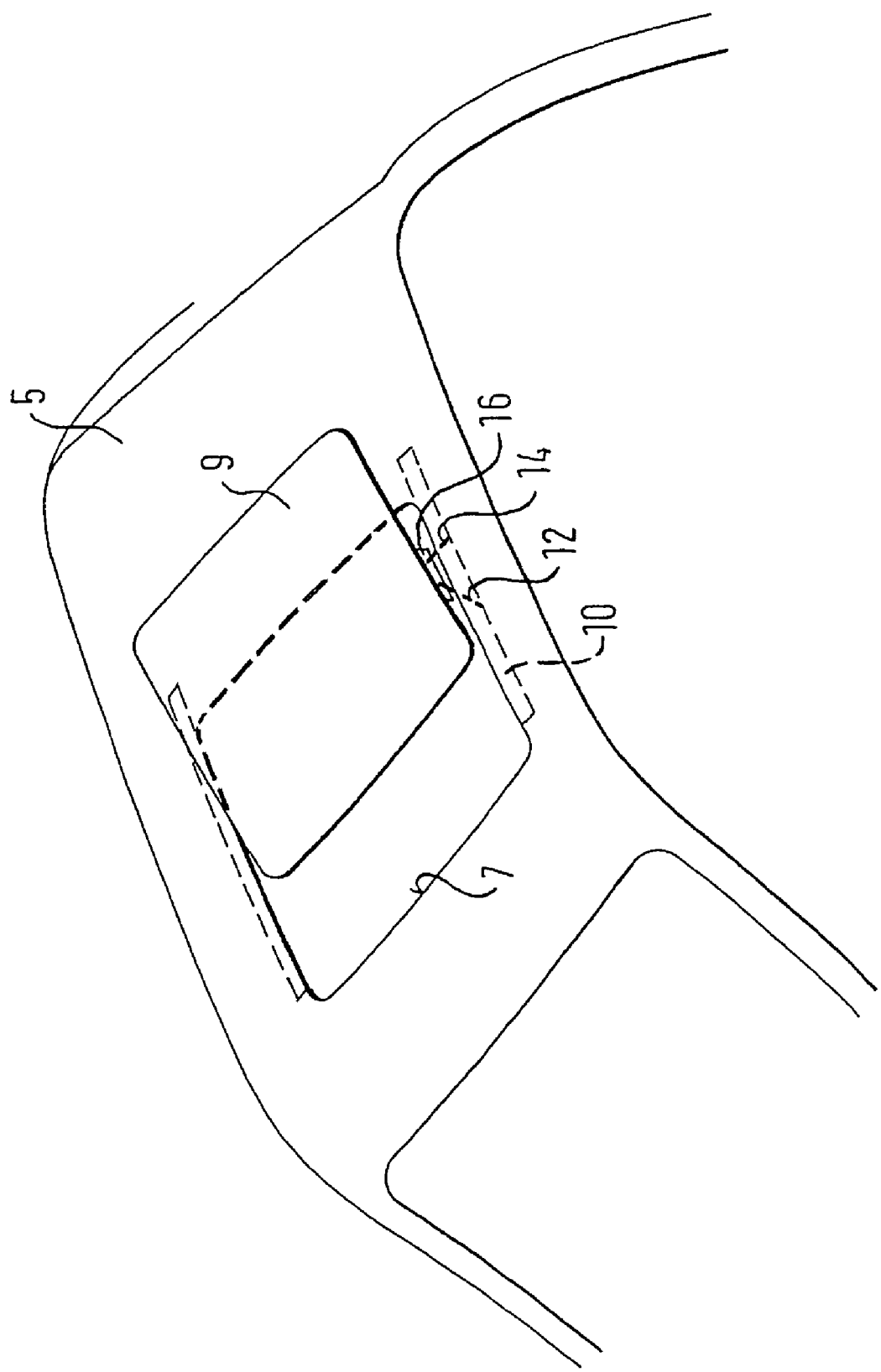
FIG. 1 is a schematic, perspective view of a vehicle roof with a sliding roof system according to the invention.

FIG. 1 shows a vehicle roof 5 with an opening 7. Associated with the opening 7 is a cover 9 that can be moved between a closed position in which the cover 9 closes the opening 7, and an open position that at least partially exposes the opening 7. Associated with the cover 9 is a sliding roof system, the essential components of which include two guide rails 10, first and second lifting levers 12, 14, and two cover supports 16. The cover supports 16 are configured as separate components that are fixedly mounted to the cover 9. Nevertheless, the cover supports 16 may also be constituted by inlay parts, which are embedded in the cover 9, or constituted by fastening tabs that are formed in one piece with the cover 9, etc.

The two guide rails 10 extend along longitudinal edges of opening 7, i.e., extend along a longitudinal direction of travel of a vehicle, from front to rear. Usually the guide rails 10 are formed by a section made of an aluminum alloy. A carriage 18 (see FIG. 2) is movably arranged in each guide rail 10. Coupled to the carriage 18 is a drive mechanism (not shown), such as a metal cable that is resistant to bending and tension for example, and which is driven by a drive motor (not shown). The carriage 18 is typically made from a plastic material.

In the first embodiment, the carriage 18 has the first and second lifting levers 12, 14 coupled to the carriage 18. The first lifting lever 12 is a front lifting lever and the second lifting lever 14 is a rear lifting lever. Slotted piece guides are used to couple the first and second lifting levers 12, 14 with the carriage 18. These are formed by a plurality of lifting slots in the carriage 18 that are engaged by pins provided on the first and second lifting levers 12, 14. The carriage 18 has a first lifting slot 20, which (related to the direction of travel of the vehicle) is arranged on a front end of the carriage 18.

As seen from the front to the rear, the first lifting slot 20 initially runs obliquely to the rear in a downward direction and then extends generally to the rear, further slightly falling away. A second lifting slot 22 is arranged on the carriage 18 roughly in the middle, with a front edge of the second lifting slot 22 lying above and ahead of a rear end of the first lifting slot 20. Starting from a front end, the second lifting slot 22 extends approximately in a straight line to the rear with a slight inclination. A short transition portion is provided in the middle, where the second lifting slot 22 extends so as to be horizontal. A third lifting slot 24 starts underneath a rear end of the second lifting slot 22, initially extends horizontally to the rear, then ascends in an upward direction, subsequently extends horizontally again to the rear, and finally extends in an obliquely downward direction to the rear.

The first lifting lever 12 is connected with the first lifting slot 20 and the second lifting slot 22 by the first and second pins 26, 27. The second pin 27 is arranged on a rear end of the first lifting lever 12, and the first pin 26 is arranged on the first lifting lever 12 at a distance from the second pin 27 further to the front. The distance between the first and second pins 26, 27, however, is smaller than half the length of the first lifting lever 12. The end of the first lifting lever 12 that is opposite to the second pin 27 is connected with the cover support 16 by a first bolt 30.

The second lifting lever 14 is connected with the third lifting slot 24 by means of third and fourth pins 28, 29. The third pin 28 is arranged on a front end of the second lifting lever 14, and the fourth pin 29 is situated behind a front end of the second lifting lever 14. The distance between the third and fourth pins 28, 29 is smaller than half the length of the second lifting lever 14. At a rear end opposite to the third pin 28, the second lifting lever 14 is connected with the cover support 16 by a second bolt 31.

The cover support 16 provides support for the cover 9, and is provided with a guide tab 34 at a front end. Attached to a lower end of the guide tab 34 is a guide pin 36. The guide pin 36 engages into a guiding slot 38. Starting from a front end of the guide rail 10, the guiding slot 38 initially extends obliquely upwards to the rear and then in a straight line along the guide rail 10.

Figure 2:
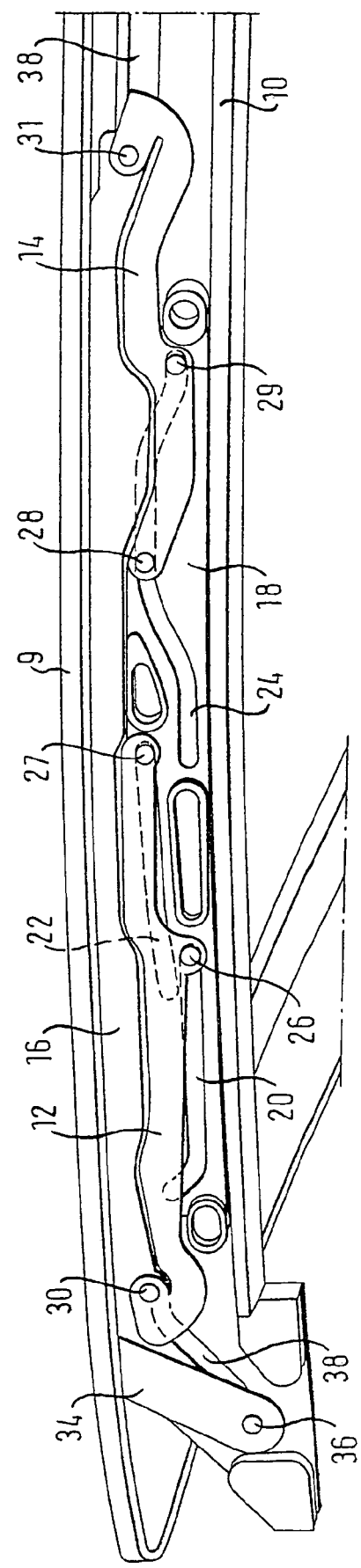
FIG. 2 is a schematic view of a guide rail in which components of a sliding roof system according to a first embodiment of the invention are arranged with a cover being in a closed position.

FIG. 2 shows the carriage 18 in a position that corresponds to the closed position of cover support 16 and cover 9. The carriage 18 is shifted to the front to the full extent, so that the fourth pin 29 is situated at a rear end of the third lifting slot 24 and the first and second pins 26, 27 are situated at the rear end of the first lifting slot 20 and second lifting slot 22, respectively. The guide pin 36 of the cover support 16 is at the front, lower end of the guiding slot 38. In this position, the cover support 16 and the cover 9 are locked in the closed position. Movement in a vertical direction is prevented by the first and second lifting levers 12, 14, which due to being coupled to the carriage 18, cannot perform a vertical movement. A movement of the cover support 16 in the longitudinal direction is prevented by the guide pin 36, which is retained in the guiding slot 38.

Figure 3:
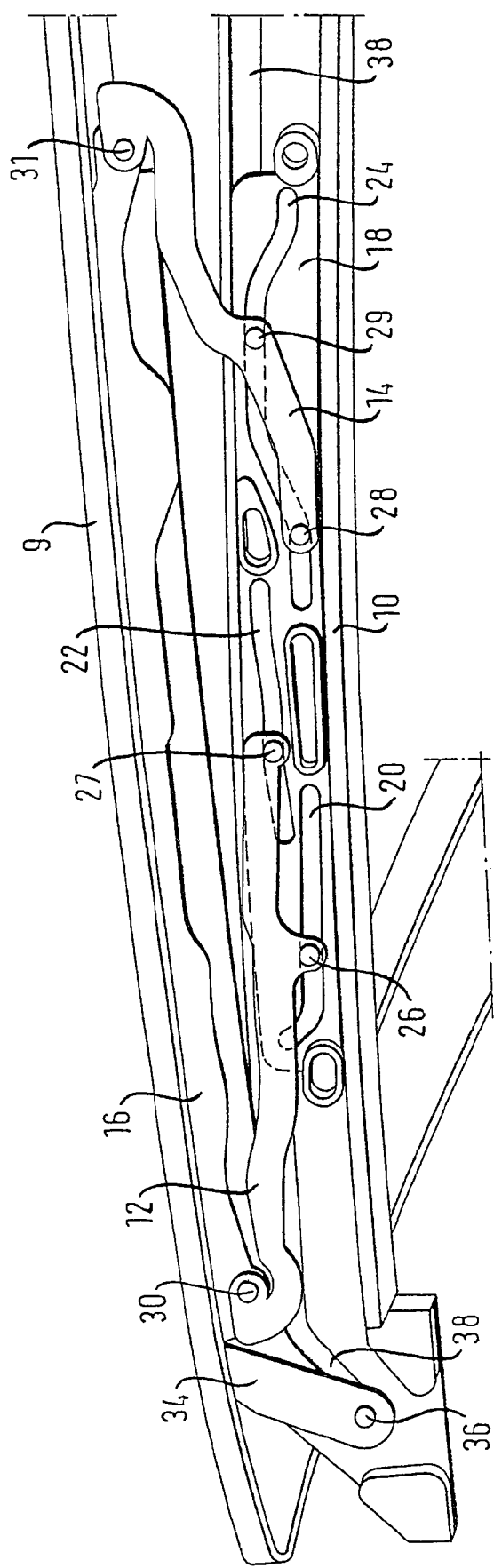
FIG. 3 is a view corresponding to that of FIG. 2, with the cover being in a ventilation position.

When cover 9 is being opened, the carriage 18 is shifted from the position shown in FIG. 2 to the rear to the position shown in FIG. 3. This causes the rear end of the second lifting lever 14, which is connected with the cover support 16, to be swiveled upwards, because the fourth pin 29 moves upward in the third lifting slot 24, while the third pin 28 moves downward in the third lifting slot 24. Thus, the second lifting lever 14 performs a swiveling motion about a point lying between third and fourth pins 28, 29, such that the rear end of the cover support 16 is lifted.

The first lifting lever 12 only performs a slight lifting motion because the second pin 27 goes down slightly during shifting of the carriage 18, while at the same time the first pin 26 goes up slightly. The resulting, short travel of the front end of the first lifting lever 12, is transferred via the first bolt 30 to the cover support 16 which performs a corresponding lifting motion in the region of the front end. This causes the guide pin 36 in the guiding slot 38 to be slightly lifted, whereby the cover support 16 is shifted to the rear by a small amount. The position shown in FIG. 3 is usually termed a ventilation position because it is mainly a rear edge of cover 9 which is lifted, so that a ventilation of vehicle interior space is achieved by a gap at the rear edge.

To further open the cover 9, the carriage 18 is further shifted to the rear. In so doing, the second lifting lever 14 essentially remains in a position shown in FIG. 3, while the front end of the first lifting lever 12 is lifted further. This can be in particular traced back to the fact that the first pin 26 is markedly shifted upwards by the front end of the first lifting slot 20. In addition, the second pin 27 further goes down in the second lifting slot 22. It is by this lifting motion at the front end of the cover support 16 that the guide pin 36 is further lifted, until the guide pin 36 enters the horizontally extending portion of the guiding slot 38. The cover support 16 together with the cover 9 can now be shifted to the rear by the carriage 18, so that the opening 7 is fully exposed in the vehicle roof 5.

If the cover 9 is to be closed again, the carriage 18 is shifted to the front, whereupon the reversed motion sequence of the first and second lifting levers 12, 14 will occur, until cover 9 has arrived in the closed position again.

A particular advantage of the sliding roof system according to the invention is that the lifting motion can be produced with very few components. Two lifting levers are used, which are directly coupled with both the carriage 18 and the cover support 16. Intermediate levers or transmission levers are not required. As the lifting slots are arranged at advantage, in particular as the lifting slots overlap each other, the carriage 18 can be configured to have a short length, seen in the direction of shifting. Despite a very small overall height, a comparably large travel of the cover 9 is produced due to the transmission achieved with the first and second lifting levers 12, 14.

In FIGS. 5 and 6 there is shown a sliding roof system according to a second embodiment. For the components known from the first embodiment the same reference numerals are used, and insofar reference is made to the above explanations.

The difference from the first embodiment is that the carriage 18 is configured to include two parts and has a front carriage part 18a and a rear carriage part 18b. The front and rear carriage parts 18a, 18b are connected with each other by a joint 19 comprising a ball joint or pivot joint. The joint 19 allows use of a guide rail with a varying curvature, to which the carriage 18 can adapt.

Figure 7:
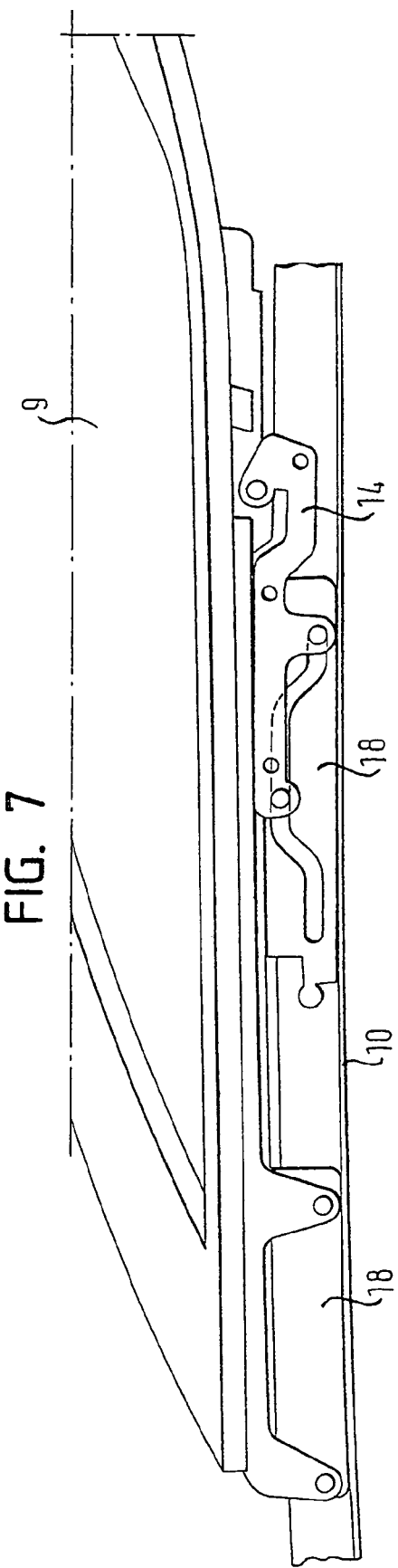
FIG. 7 shows in a view corresponding to that of FIG. 2, a sliding roof system according to a third embodiment of the invention.
Figure 8:
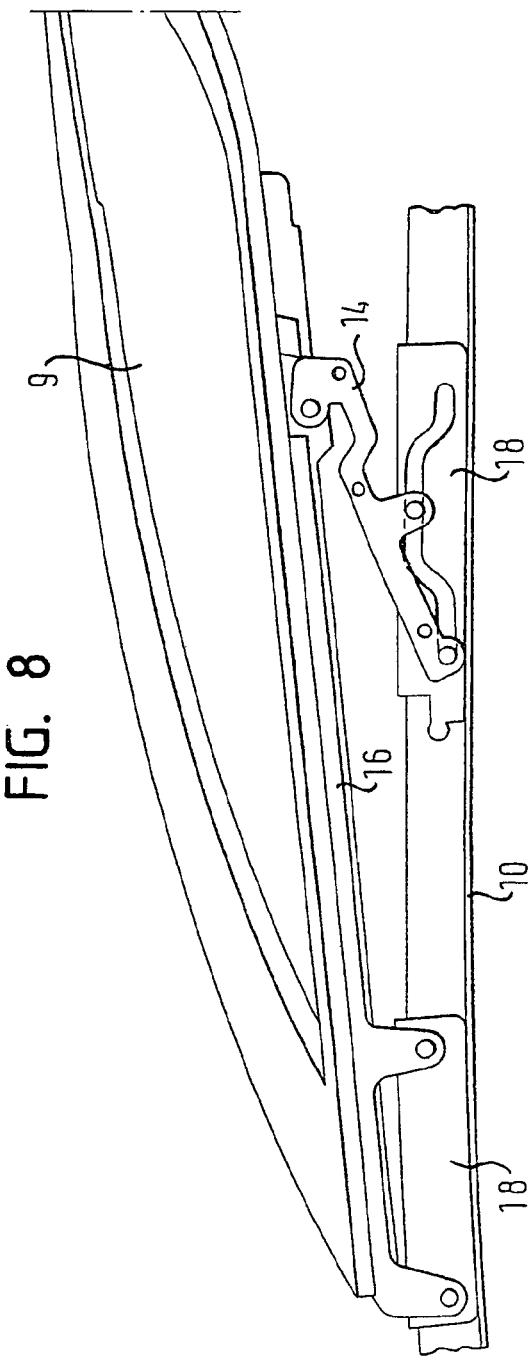
FIG. 8 shows in a view corresponding to that of FIG. 4, the sliding roof system according to the third embodiment.

In FIGS. 7 and 8 there is shown a sliding roof system according to a third embodiment. For the components known from the first embodiment the same reference numerals are used, and insofar reference is made to the above explanations.

The difference from the first embodiment is that the cover 9 of the third embodiment can only be put to a ventilation position (see FIG. 8) and cannot be completely moved to the rear. In this configuration, the first lifting lever at the front may be omitted; there is merely provided the second lifting lever 14 at the rear. Accordingly, the carriage 18 is provided with one lifting slot only, namely the third lifting slot 24 at the rear, known from the first embodiment. This third lifting slot 24 is also known from the rear carriage part 18b of the second embodiment.

Figure 9:
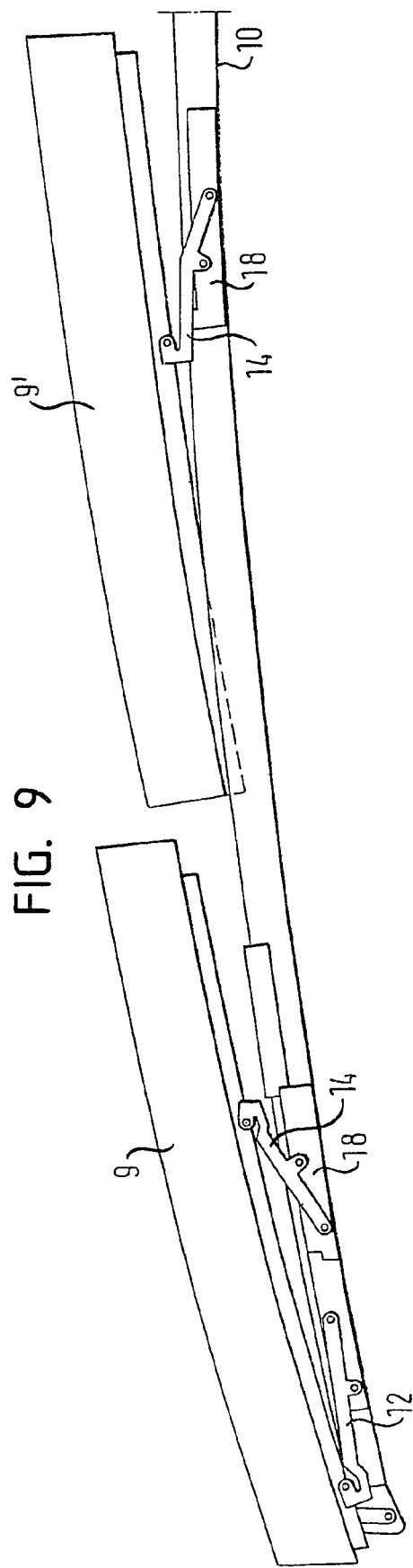
FIG. 9 shows in a view corresponding to that of FIG. 3, a sliding roof system according to a forth embodiment.
Figure 10:
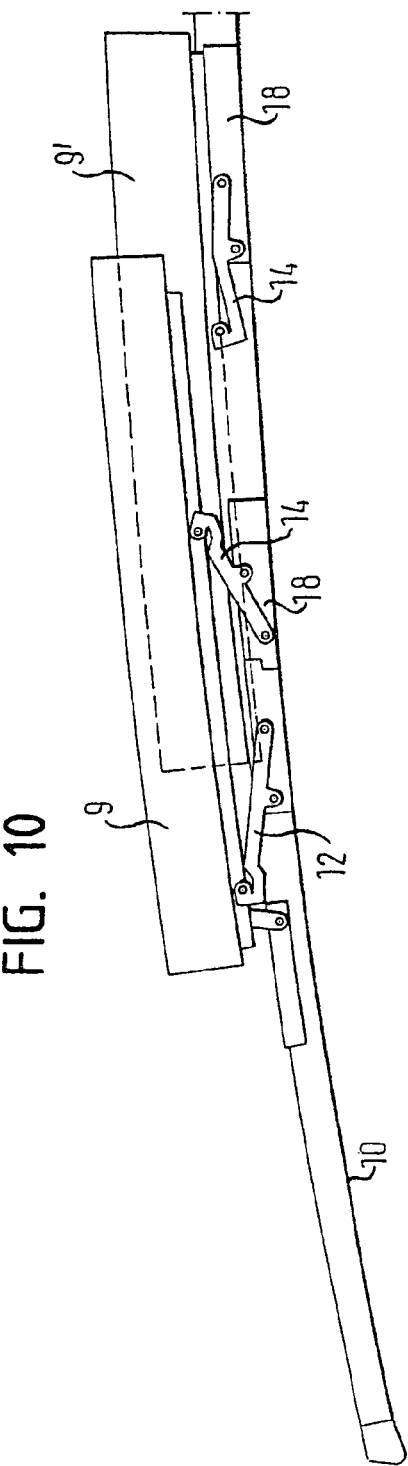
FIG. 10 shows the sliding roof system of FIG. 9, in a fully open position.

In FIGS. 9 and 10 there is shown a sliding roof system according to a fourth embodiment. For the components known from the first embodiment the same reference numerals are used, and insofar reference is made to the above explanations.

The sliding roof system according to the fourth embodiment is a combination of the first and third embodiments. The fourth embodiment includes a first cover 9 that can be moved from a ventilation position (see FIG. 9) to a fully open position (see FIG. 10). As seen in the direction of travel, there is additionally provided behind cover 9 a second cover 9', which from a fully closed position can only be put to a ventilation position (see FIG. 9). In case the first cover 9 is raised outwardly beyond the ventilation position and then moved to the rear, the second cover 9' will return to the closed position (see FIG. 10) again, so that the first cover 9 can pass over the second cover 9'.

For controlling the first 9 and second 9' covers there are provided separate drive mechanisms (not shown) that can be signaled in an appropriate manner. It is also conceivable to use one drive mechanism only, which is coupled with the carriage 18 for the first and second covers 9, 9' in a suitable way, so that, during opening the first cover 9, the second cover 9' performs the desired movement to the ventilation position and back again.

Figure 11:
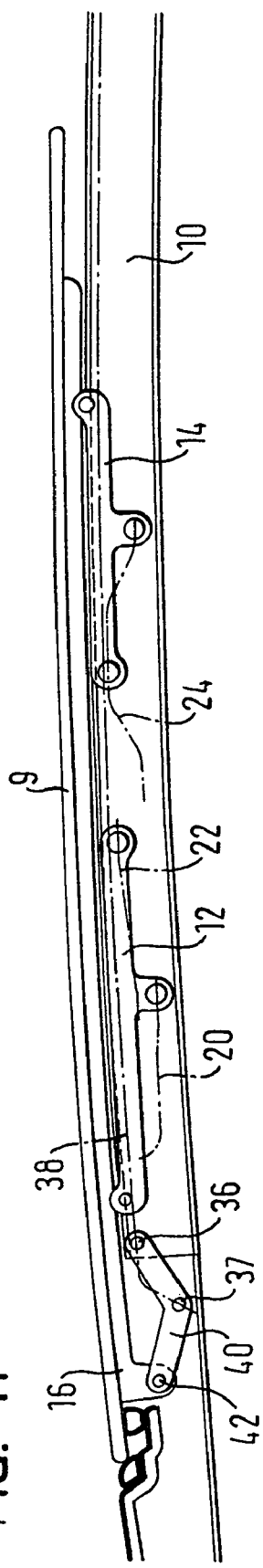
FIG. 11 is a schematic side view of a sliding roof system according to a fifth embodiment, with the cover being in an open position.
Figure 12:
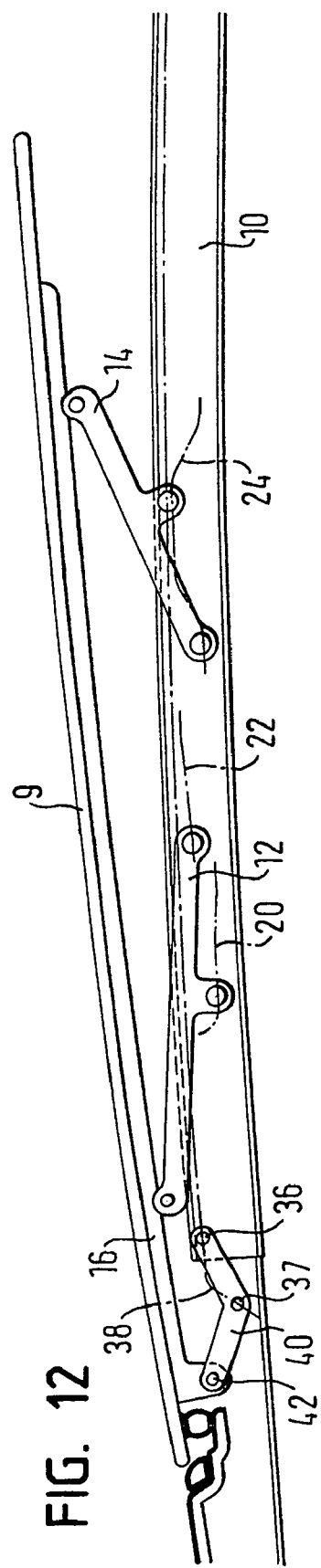
FIG. 12 is a schematic side view of the sliding roof system of FIG. 11, with the cover being in a ventilation position.
Figure 13:
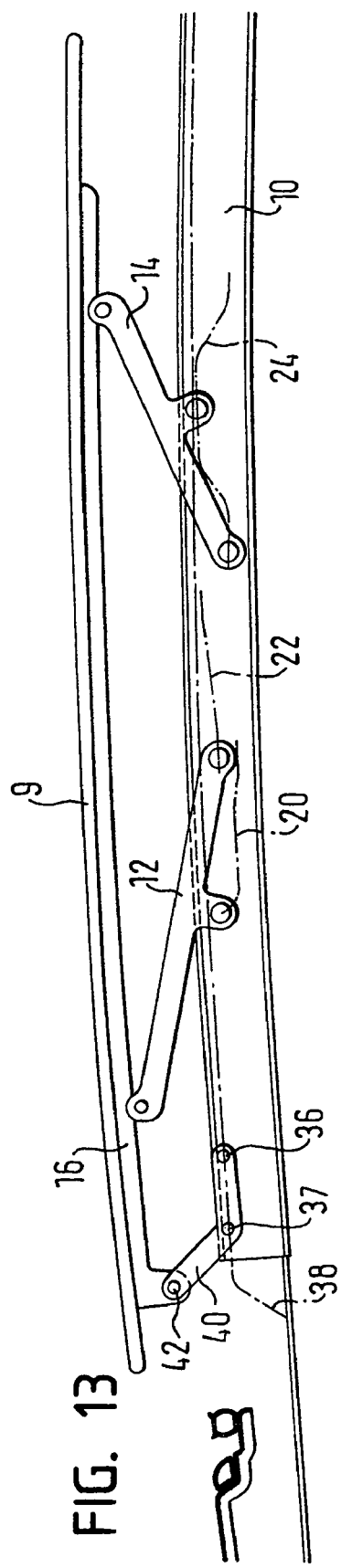
FIG. 13 shows a further side view of the sliding roof system of FIG. 11, with the cover being in an outwardly raised position.

FIGS. 11 to 13 show a sliding roof system according to a fifth embodiment. In the basic construction, the fifth embodiment corresponds to the first embodiment, so that essentially only the differences of the fifth embodiment in relation to the first embodiment will be described in the following.

The sliding roof system according to the fifth embodiment differs from that according to the first embodiment in that a guiding lever 40 is provided instead of the guide tab 34 fixedly attached to the cover support 16. One end of the guiding lever 40 is pivotally connected with the cover support 16 by a joint 42. A side of the guiding lever 40 facing away from the joint 42 is connected with the guiding slot 38 (shown in FIGS. 11–13 at its center axis) through first and second guide pins 36, 37. In the embodiment shown, two portions of the guiding lever 40 include an angle of about 140°. Other values are also possible depending on the constructional circumstances.

When the cover 9 is in the closed position (FIG. 11), the guiding lever 40 retains the front end of the cover support 16 in a lowered position. It is in this position of the guiding lever 40 that the guide pin 36, attached to the end of the guiding lever 40 that faces away from the cover support 16, is situated in the upper, approximately horizontally extending portion of the guiding slot 38. The second guide pin 37, which is arranged approximately in the middle of the guiding lever 40, is situated at the lower, front end of the guiding slot 38.

When the cover 9 is in the ventilation position (FIG. 12), the cover 9 has been shifted as a whole by a certain amount to the rear (to the right in the Figures) in relation to the closed position. Thereby the second guide pin 37 of the guiding lever 40 has moved upwards by a small amount in the guiding slot 38, while the first guide pin 36 has merely traveled to the right approximately on a constant level. Thereby the guiding lever 40 has been pivoted in a clockwise direction about the first guide pin 36 (in addition to the translational movement), so that the joint 42, and with this the front edge of the cover 9, has been shifted in upward direction. Thus, the cover 9 has been lifted away from a seal against which the cover 9 rests at a front edge.

When the cover 9 is in a position where the cover 9 is fully raised outwardly (FIG. 13), the cover 9 has been shifted to the right and beyond the ventilation position. Thereby the second guide pin 37 also arrives at the horizontal portion of the guiding slot 38. This causes the guiding lever 40 to pivot about the first guide pin 36 even farther, so that the front edge of the cover 9 will be raised outwards to the maximum extent.

Figure 4:
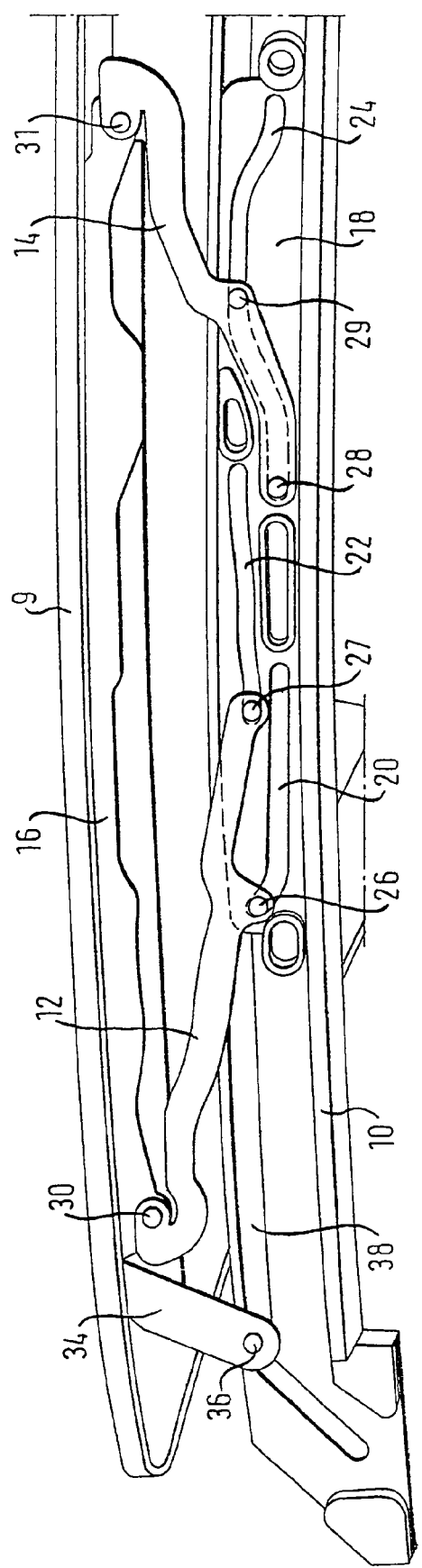
FIG. 4 is a view corresponding to that of FIG. 2, with the cover being in a fully raised position extending outwardly.

The particular advantage of the fifth embodiment is the compact design. The first embodiment requires elongation of the guiding slot at a front end as far as underneath a level which is defined by the guide rail proper. This portion, clearly seen in FIGS. 2 to 4, results in a large overall height and may lead to a restriction of the headroom in the interior of the vehicle. With the fifth embodiment the guiding lever 40 acts as a transmission mechanism. The guiding slot 38 has a comparably small height, because the guiding slot 38 is fully housed within the profile of the guide rail 10; a portion protruding downward is not necessary. By the guiding lever 40, the small height of the guiding slot 38 is translated to a larger travel of the front portion of cover 9.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A sliding roof system comprising:
   at least one guide rail;
   a carriage shiftable in the at least one guide rail;
   a cover support adapted for attachment to a cover, the cover support being coupled with the carriage;
   a first lifting lever having one end connected to the cover support and another end connected to the carriage with first and second guide pieces that are movable relative to the carriage; and
   a second lifting lever having one end connected to the cover support, and another end connected to the carriage with third and fourth guide pieces.

2. The sliding roof system according to claim 1 wherein the cover support is in engagement with a guiding slot fanned in the at least one guide rail.

3. The sliding roof system according to claim 2 wherein the cover support is in direct engagement with the guiding slot via at least one pin.

4. The sliding roof system according to claim 2 wherein the cover support is coupled to the guiding slot with a guiding lever.

5. The sliding roof system according to claim 4 wherein the guiding lever converts travel of the guiding slot into greater travel of the cover support.

6. The sliding roof system according to claim 1 wherein a distance between the first and second guide pieces is less than half an overall length of the first lifting lever.

7. The sliding roof system according to claim 1 wherein the carriage includes at least one lifting slot and wherein at least one of the first and second guide pieces comprises a pin supported by the first lifting lever that engages into the at least one lifting slot.

8. The sliding roof system according to claim 7 wherein the at least one lifting slot comprises first and second lifting slots and wherein the first lifting lever engages into the first and second lifting slots.

9. The sliding roof system according to claim 7 wherein the second lifting lever is in engagement with at least one lifting slot.

10. A sliding roof system comprising:
at least one guide rail;
a carriage shiftable in the at least one guide rail wherein the carriage includes a front carriage part and a rear carriage part that are pivotally connected to each other;
a cover support adapted for attachment to a cover, the cover support being coupled with the carriage; and
a first lifting lever having one end connected to the cover support and another end connected to the carriage with first and second guide pieces that are movable relative to the carriage.

11. The sliding roof system according to claim 1 wherein the cover includes a first cover portion and a second cover portion, the first cover portion being movable to lie above the second cover portion.

12. The sliding roof system according to claim 1 wherein the carriage includes a plurality of lifting slots including a first lifting slot and a second lifting slot, the first guide piece being received within the first lifting slot and the second guide piece being received within the second lifting slot.

13. A sliding roof system comprising:
at least one guide rail;
a carriage shiftable in the at least one guide rail;
a cover support adapted for attachment to a cover, the cover support being coupled with the carriage;
a first lifting lever having one end connected to the cover support and another end connected to the carriage with first and second guide pieces that are movable relative to the carriage, and wherein the carriage includes a plurality of lifting slots including a first lifting slot and a second lifting slot, the first guide piece being received within the first lifting slot and the second guide piece being received within the second lifting slot; and
a second lifting lever having one end connected to the cover support and another end connected to the carriage by third and fourth guide pieces wherein the plurality of lifting slots includes a third lifting slot, the third and fourth guide pieces being received within the third lifting slot.

14. The sliding roof system according to claim 13 wherein the first and second guide pieces comprise first and second guide pins provided on the first lifting lever and wherein the third and fourth guide pieces comprise third and fourth guide pins provided on the second lifting lever.

15. The sliding roof system according to claim 13 wherein the first guide piece is movable within the first lifting slot, the second guide piece is movable within the second lifting slot, and the third and fourth guide pieces are movable within the third lifting slot to move the cover between open and closed positions.

* * * * *

UNITED STATES PATENT AND TRADEMARK OFFICE
CERTIFICATE OF CORRECTION

PATENT NO. : 7,178,862 B2 Page 1 of 1
APPLICATION NO. : 11/100792
DATED : February 20, 2007
INVENTOR(S) : Holger Oechel It is certified that error appears in the above-identified patent and that said Letters Patent is hereby corrected as shown below:

Claim 2, Column 6, line 45: "fanned" should be --formed--

Signed and Sealed this

First Day of May, 2007

JON W. DUDAS
*Director of the United States Patent and Trademark Office*